Patented Oct. 14, 1952

2,614,125

UNITED STATES PATENT OFFICE 2,614,125

OLEFIN OXIDATION PROCESS EMPLOYING CUPROUS OXIDE CATALYSTS

Kenneth D. Detling, Berkeley, and Thurston Skei, Lafayette, Calif., assignors to Shell Development Company, San Francisco, Calif., a corporation of Delaware No Drawing. Application January 10, 1949, Serial No. 70,144

10 Claims. (Cl. 260—604)

This invention relates to processes for partial oxidation of organic compounds in the gaseous state in the presence of a solid catalyst, and to improvements in the same. More particularly, the invention relates to processes for effecting the partial oxidation of olefins containing at least three carbon atoms in the gas phase in the presence of a solid catalyst essentially comprising cuprous oxide, and to a method for maintaining and/or restoring high activity of the catalyst during the execution of such processes. Still more particularly, the invention pertains to a method for reactivating a catalyst essentially comprising cuprous oxide, which catalyst may have deteriorated in activity as a result of use under conditions in the processes of the character to which the invention relates, such that loss in catalyst activity has been incurred.

The invention is limited to the process in which a gaseous mixture comprising an olefin containing at least three carbon atoms and an oxygen-containing gas, e. g., air, oxygen, oxygen-enriched air, etc., is contacted with a solid catalyst essentially comprising cuprous oxide under conditions which favor oxidation of the olefin to an unsaturated carbonylic compound of the group consisting of the unsaturated aldehydes and unsaturated ketones. The process ordinarily will be executed with the catalyst in the form of a fixed bed that is immobile in bulk, positioned in a suitable reactor or reactors, and a continuous stream of the gaseous mixture will be passed into contact with the catalyst bed, the gaseous effluent from the reactor containing the desired product. In other cases, the catalyst may be in a mobile, or fluidized form in a reactor, and a portion of the catalyst may be carried along with the effluent from the reactor, to be subsequently returned. In still other cases, the catalyst may be in the form of a mobile, or pseudo-liquid, or fluidized bed of finely-divided solid catalyst, but permanently held in a reaction zone. Instead of finely-divided catalyst carried along in part by the gaseous effluent from the reaction zone, there also may be used at times mobile catalyst beds from and to which catalyst is continuously withdrawn and added, respectively, as by mechanical means. Although the principles of the invention are applicable in all instances, and the process of the invention may be employed in each case with suitable modification, it is of particular interest and advantage as employed in processes in which the reaction mixture is passed into contact with a fixed bed of the catalyst, and the invention accordingly will be described with particular reference thereto.

In the catalytic oxidation of olefins containing at least three carbon atoms in gas phase over a catalyst essentially comprising cuprous oxide to produce an unsaturated carbonylic compound of the group consisting of the unsaturated aldehydes and the unsaturated ketones, it has been found that the catalyst life is a function of the concentration of oxygen relative to the propylene contained in the reaction mixture passed into contact with the catalyst. It has been further observed that the activity of the catalyst is a function of the partial pressure of oxygen in the feed. Increasing the amount of oxygen relative to the amount of propylene, other conditions being unchanged, or increasing the total pressure upon the gaseous reaction mixture, thereby increasing the partial pressure (in absolute units) of oxygen in the feed to the catalyst, result in decreased catalyst life, or, conversely, in increased rate of catalyst deactivation. For certain operations, however, it is desirable as for reasons of plant design, operational economy, or the like, to operate under such conditions of high oxygen:olefin ratio or high partial pressure of oxygen in the feed to the reactor that an excessive rate of decline of catalyst activity is incurred. A practicable means for overcoming deactivation of the cuprous oxide catalyst resulting from the foregoing or other causes therefore is highly desired, and forms a principal object of the present invention.

As a specific example of the effect of increased ratio of oxygen:olefin and/or of increased partial pressure of oxygen in the reactor feed upon the activity of the cuprous oxide catalyst, the following illustrative experiments may be described:

(a) At a catalyst temperature of about 375° C. and a pressure of about 30 pounds per square inch (gauge) a stream of a gaseous mixture having a nominal composition of 20% by volume propylene, 20% by volume air (actual mole ratio $O_2$:propylene 0.24 to 0.22), and the balance inert gas (steam) was passed at a rate corresponding to an apparent contact time of about 1.0 second, through a reaction tube in which there was disposed a catalyst composed of cuprous oxide deposited on silicon carbide porous aggregates containing about 2.1% by weight cuprous oxide. Effluent from the reaction tube was passed through a water-cooled condenser where product (acrolein) was condensed and separated along with traces of secondary products of oxidation. The activity of the catalyst was estimated periodically from the yield of acrolein based upon the amount of propylene being consumed and from the amount of oxygen fed being consumed, both determined by suitable analyses of samples of the reactor effluent collected at intervals during the run. In this experiment, approximately 70% of the oxygen fed was consumed, and of the propylene consumed about 70% was converted to acrolein, both values remaining constant within experimental error over the 183 hour duration of the run. The constant yield of acrolein and the constant consumption of oxygen fed indicated that under the conditions of this experiment negligible or no loss in activity of the catalyst was incurred.

(b) When the amount of oxygen relative to the propylene was increased, the activity of the catalyst declined appreciably during a similar run. Thus, employing the same catalyst and reaction conditions as in the preceding experiment, except changing the feed composition to the nominal values of 10% by volume propylene 5% by volume oxygen (actual mole ratio $O_2$:propylene, 0.45 to 0.42), and the balance inert gas (steam), the activity of the catalyst, instead of remaining substantially constant as in the foregoing run, declined by about one-half, as determined by the amount of oxygen being consumed at the beginning and the end of the on-stream time of 12.5 hours.

(c) The effect of increasing the partial pressure of the oxygen in the reaction mixture was similar to the effect observed in the immediately foregoing experiment. When the first experiment was repeated employing the same reaction conditions and nominal feed composition (actual mole ratio $O_2$ : propylene, 0.24 to 0.23), except operating at a pressure of 45 pounds per square inch (gauge) instead of 30 pounds per square inch (gauge) the activity of the catalyst declined by about 27% during the on-stream time of 64 hours, as determined by the amount of oxygen being consumed at the beginning and the end of the run. A possible explanation of the observed results could be, of course, that the oxygen when present in the greater relative proportions or absolute amounts employed in the latter two experiments oxidized the cuprous oxide to cupric oxide, which is inactive as a catalyst for the oxidation of propylene to acrolein. That this attempted explanation would be incorrect is evidenced by the fact that throughout each of the described experiments the yield of acrolein, based upon propylene consumed, remained constant within the limits of experimental error and the known fact that cupric oxide is a catalyst for oxidation of unsaturated hydrocarbons to various oxygenated hydrocarbons other than unsaturated aldehydes and unsaturated ketones. In other words, since cupric oxide is a known catalyst for oxidation of olefins, although different products are formed than when the catalyst is cuprous oxide, the decline in catalyst activity is not accounted for by conversion of the catalyst to cupric oxide because throughout each experiment the proportion of acrolein to all other products remained substantially constant. These, as well as numerous other experiments of a similar nature which have recently been carried out, strongly suggested that the presence of an excess of oxygen was deleterious to the cuprous oxide catalyst in the process with which the invention is concerned and indicated that for optimum conditions of operation the presence of excessive amounts of oxygen (relative or absolute) in contact with the catalyst should be avoided.

The present invention is based upon the startling and unexpected discovery that cuprous oxide catalysts which in the course of catalytic gas phase partial oxidation of olefins containing at least three carbon atoms to produce unsaturated carbonylic compounds of the group consisting of the unsaturated aldehydes and the unsaturated ketones, have become partially or wholly deactivated, may actually be reactivated, or restored substantially to their original level of activity, or maintained at a high overall level of activity, by periodically and for brief intervals of time substantially decreasing or discontinuing the flow of the gaseous olefin to the catalyst and during such intervals of decreased or interrupted flow of olefin subjecting the catalyst to the action of a stream of a molecular oxygen-containing gas, as by briefly sweeping the catalyst with the gaseous feed of adjusted composition. Thereafter, the operating conditions of the oxidation process may be restored, and the catalyst, which will have been reactivated by the treatment and which generally will have an activity at least equal to and at times even greater than its original activity, may be employed for catalyzing the oxidation of further quantities of the olefin reactant to desired product.

The present invention is not concerned with the type of catalyst treatment known as catalyst regeneraion, which treatment involves the removal, as by burning off or washing, or by decomposing with steam, of carbonaceous, tarry, or like materials deposited on the surface of a catalyst or in the pores of a catalyst. Such practices are well-known, particularly in arts such as catalytic cracking, polymerization, etc., of hydrocarbons or hydrocarbon mixtures. The formation of deposits on or in the cuprous oxide catalyst in processes of the character with which the present invention is concerned does not cause a serious problem because of the negligible extent to which it occurs. For example, in the experiments described above and in numerous similar experiments which have been carried out, no significant change in the external appearance of the catalyst was observed, indicating the freedom from tarry, carbonaceous or like deposits on the surface or in the pores of the catalyst. The present invention is directed to a treatment designed to overcome or to prevent deterioration in catalyst activity from less tangible causes than mechanical obstruction of the catalyst by deposits thereon or therein. In the process to which the invention relates there may be observed over prolonged periods of operation a gradual and progressive decline in the activity of the cuprous oxide catalyst for promoting the desired reaction. The decline may be qualitative—that is, the selectivity of the catalyst may be reduced, with the result that the amount of the organic material converted to the desired product becomes less and the relative proportion of undesired by-products increases—or the decline may be quantitative in the sense that the catalyst simply becomes less active for promoting oxidation reactions, with or without change in selectivity. In the latter case, the amount of the olefin feed oxidized decreases, while in the former case it is the yield of desired product based upon the amount of the olefin feed consumed that decreases. The decrease in activity generally is accompanied by little or no change in the outward appearance of the catalyst.

While it is not desired to limit the invention according to any theory, it appears possible that these changes in activity of the cuprous oxide catalyst may be due, at least in part, to qualitative and/or quantitative changes in adsorption sites on the surface of the catalyst. It is generally recognized that heterogeneous catalysis by a solid catalyst is a surface phenomenon in which adsorption of reactants and reaction products at adsorptive sites on the catalyst plays an important role. A qualitative change, chemical or physical, in the character of the adsorption sites could lead to a corresponding change in the activity of the catalyst. Such changes in the adsorptive sites may occur even though the cuprous oxide catalyst, viewed in bulk, would appear unchanged. On the other hand, a reduction in the number of active sites, as by the adsorption on the catalyst of a component normally present in the gaseous reaction mixture (for example, a product of side reaction, or an impurity in the gaseous feed) could lead to a marked decrease in the overall activity of the catalyst. Since under normal operating conditions of a continuous process, all components of the reaction mixture ordinarily are present in relatively constant amounts, each tends to be adsorbed by the catalyst until equilibrium is reached. Changes in the character of the adsorptive sites, even though slight, may result in preferential adsorption of a species not involved in the mechanism of the oxidation, with consequent "blocking" of such sites from playing a useful role on the catalyst surface.

The oxidation of the olefins containing at least three carbon atoms in the presence of the cuprous oxide catalyst to produce the desired unsaturated aldehydes or ketones is effected under controlled or selected conditions of temperature and pressure. The temperature within the reactor generally is within the range of from about 150° C. to about 650° C. In some cases, higher temperatures may be employed, provided excessive decomposition of the olefin and/or the desired product does not result; while in other cases, maximum temperatures lower than 600° C. are desidable, say 450° C. as a maximum. Temperatures of from about 300° C. to about 500° C. are generally suitable. The gaseous mixture contacted with the catalyst may be under substantially atmospheric pressure, or it may be under a pressure above or below the atmospheric pressure. Superatmospheric pressures may be employed, ranging upward to several atmospheres of pressure; however, excessively high pressures, e. g., pressures above about 20 atmospheres usually will be avoided because it is desired to maintain the olefin in the vapor state. Pressures of from 4 to 15 atmospheres are particularly desirable in certain instances. For reasons which will be apparent hereinbefore and hereinafter, the method of the invention is particularly advantageous in certain of its aspects when employed in conjunction with oxidation processes effected at such moderately elevated pressures.

The present invention is based upon the discovery that the cuprous oxide catalyst in the aforesaid oxidation process may be maintained at a high level of activity under conditions of operation conducive to its deactivation or, if partially or wholly deactivated, may be restored to a high level of activity, by periodically and temporarily subjecting the catalyst to a stream of a molecular oxygen-containing gas, preferably in the absence of the organic compound which is undergoing oxidation in the process under consideration, at temperatures and pressures preferably within the range of temperatures and pressures pertaining in the process. The reactivation treatment may be carried out very simply; therein lies one of its advantages. For example, the feed of the olefin supplied to the catalyst in admixture with oxygen, air, oxygen-enriched air, etc., and generally with inclusion of an inert gas, such as steam, nitrogen, carbon dioxide, methane, etc., simply may be turned off for a brief period of time while the flow of the remaining components of the gas stream is left undisturbed or at the most given minor adjustment to compensate for the shutting-off of one component. Change in temperature of the catalyst bed or change in temperature and/or pressure of the gas stream is not required, although not precluded. After a brief period during which the stream of oxygen or air, or oxygen or air diluted with inert gas is passed over the catalyst, the flow of the organic compound to be oxidized is restored and the oxidation process continued. In some cases it may be more convenient to divert the entire feed to the catalyst, for example, to a second reactor arranged in parallel flow to the reactor containing the catalyst to be reactivated, and to replace the diverted stream with another stream of oxygen-containing gas mixture, for example, air, oxygen-enriched air, mixtures of oxygen or air with one or more inert gases, etc. After the brief reactivation treatment, the stream of reactivating gas may be discontinued and the reaction mixture restored to the reactivated catalyst, and the oxidation process continued as before the reactivation treatment but with greatly enhanced catalyst activity. It indeed was surprising and could not have been foreseen that, whereas increasing the amount of oxygen relative to the olefin or increasing the partial pressure of the oxygen in the reaction mixture even increased or caused deactivation of the cuprous oxide catalyst, sweeping the catalyst with oxygen gas alone or with mixtures of oxygen and inert gases would actually reactivate or even increase the activity of catalysts deactivated in the course of the olefin partial oxidation process here involved.

The method of the present invention has several advantages. When the oxidation process is conducted with an amount of olefin in the reactor feed less than an amount which would produce an explosive mixture under the operating conditions of temperature, pressure, and concentration of oxygen in the feed to the catalyst, shutting off the supply of the olefin reactant results in still lower olefin concentrations than existed previously. In other words, in such cases the change in the composition of the reactor feed is in a direction away from the possible formation of explosive mixtures in the apparatus. In such cases the method of the invention thus avoids the dangers resulting from the presence of explosive gas mixtures, an important advantage particularly in large-scale operations of processes of the character here involved. The method of the present invention has been employed for reactivating deactivated cuprous oxide catalysts which could not be restored to full activity by other available methods short of possible dissolution and redeposition of the cuprous oxide on the carrier material. The method of the present invention also is advantageous as to the matter of cost. Still further advantages of the invention will be apparent hereinbefore and hereinafter.

As indicated hereinbefore, in the oxidation of olefins containing at least three carbon atoms over a cuprous oxide catalyst to produce unsaturated aldehydes and unsaturated ketones, it is found that only under certain operating conditions does undesirable deactivation of the catalyst occur. Since for reasons of plant design, etc., it may be desired to operate within ranges including such conditions, the method of the present invention provides an efficient and desirable means for overcoming deactivation that may be encountered. Since the reactivation can be accomplished by briefly discontinuing at intervals the olefin feed and sweeping the catalyst with the other components of the reactor feed, without necessity for adjusting further the temperature, pressure, etc., the method of the present invention provides a desirable and highly efficient means for overcoming deactivation of the cuprous oxide catalyst.

The method of the present invention may be put into practice most conveniently by periodically shutting off for brief intervals of time the supply of the olefin reactant fed to the catalyst and for a brief interval passing only the balance of the reactor feed, containing the oxygen, over the catalyst, and then restoring to the catalyst the flow of the complete reaction mixture. High catalyst activity at a substantially constant overall level thus may be maintained simply by periodically interrupting the flow of olefin to the catalyst while, at the same time, maintaining the conditions of operation otherwise substantially unchanged. No substantial change in the operating pressure or the operating temperature thus is required. This characteristic makes the method of value when the oxidation process is carried out in apparatus of substantial volume and when, accordingly, need for change in the existing pressure would be undesirable. When the change in flow-rate or pressure that would result from interruption of the flow of olefin to the catalyst is not undesirable, it will not be necessary to adjust the flow rates of the other components of the reactor feed to compensate. In other cases, the flow rates of the other components may be increased or otherwise modified to adjust or to maintain the conditions of flow rate and/or pressure to or at desired values and, if necessary, to prevent the composition of the gas mixture during the adjustment of the flow and/or the reactivation treatment passing into or through a range of explosive compositions.

The frequency of the reactivation treatment and the duration of the individual treatments given depends in part upon the extent of deactivation of the catalyst as well as upon the particular conditions existent during the reactivation. Ordinarily, interrupting the flow of olefin for periods of not over one hour is sufficient, while in many cases periods of from as little as two to three minutes to one-half hour suffice. The frequency of the reactivation treatment will generally be a function of the rate of catalyst deactivation, and may be determined by the level of activity of the catalyst and its changes during the oxidation of the olefin. If it is desired to operate with the aid of automatic equipment which periodically and automatically shuts off the flow of olefin to the catalyst, a suitable frequency and duration of reactivation may be determined by preliminary experiments and suitable timing thereby arranged. In some cases it may be desirable to reactivate the catalyst as frequently as once every hour or two, while in other cases reactivation at only infrequent intervals may be required, say, after every hundred or more hours of operation. Under otherwise equal conditions, the shorter the interval between the reactivation treatments, the shorter the interval of interrupted olefin flow that generally need be employed. Generally, not over about 10% of the total time is accounted for by the intervals of interrupted olefin flow, and more often not over about 5% of the total time will be thus accounted for. The method of the invention therefore is of particular advantage when the reactors are of the fixed catalyst-bed type since it becomes a simple matter to provide an accumulator or lagging vessel in which crude product can be stored, for example, after condensation from the reactor effluent, to enable a constant supply to later stages of the process, such as product purification stages. In effect, continuous operations are obtained despite the use only of a single reactor and the discontinuous flow of olefin to the reactor.

The oxygen content of the gas mixture passed over the catalyst during the interval of interrupted olefin flow, while not highly critical, desirably is in excess of about three volume per cent. Air, oxygen-enriched air, or even pure oxygen may be used. Prior to, following, or both before and after the reactivation treatment, the catalyst or reaction system, if desired, may be swept out or flushed with an inert gas such as steam, nitrogen, carbon dioxide, etc., for example, to remove residues of the gas last passed therethrough. If the oxygen-containing gas mixture employed for reactivation of the catalyst contains large amounts of oxygen, say more than about 75% by volume, it may be desirable to give the catalyst, prior to restoration of the flow thereto of the reaction mixture containing the olefin, a brief reduction treatment to insure conversion to cuprous oxide of any incidental amounts of cupric oxide formed during exposure to the oxygen. This may be accomplished by briefly passing the pure olefin over the catalyst at the elevated temperature employed, by brief treatment with hydrogen, or otherwise. Because need for such reduction is in general obviated thereby, it is preferred to employ for the reactivation treatment oxygen-containing gas mixtures containing not over about 35% by volume of oxygen. Such mixtures may be, for example, air, oxygen-enriched air, or oxygen or air mixed with one or more inert gases, such as steam, nitrogen, methane, flue gas, etc.

If the oxidation process with which the present invention is concerned is operated with compositions of the reactor feed (olefin, oxygen, inert gas) such that the oxygen concentration therein is below the oxygen concentration of an explosive mixture under the operating conditions of pressure, temperature, and concentration of olefin in the feed, increasing sufficiently the oxygen concentration or replacing the flow of the mixture by a gas stream having a higher content of oxygen, for example air or mixtures of oxygen with an inert gas, in the absence of suitable precautions, such as an intervening sweep-out with an inert gas, could cause the composition of the gaseous stream in the reaction system to pass into or through a range of explosive compositions. It has been found that likelihood of such formation of explosive gas mixtures can be greatly minimized by employing for the reactivation treatment according to the present invention mixtures of oxygen with one or more inert gases, having oxygen concentrations below a predetermined critical level. By also conducting the oxidation process with feed mixtures having oxygen concentrations below the same critical level, likelihood of formation of explosive mixtures in the reaction system during or attendant upon the reactivation of the catalyst by treatment thereof with an oxygen-containing olefin free gas stream can be positively excluded, without necessity for precautions to prevent mixing of the reactor feed containing olefin and the oxygen-containing gas stream employed for the reactivation treatment.

The oxygen concentration represented by the aforesaid critical predetermined level is dependent to a limited extent upon the identity of the olefin undergoing oxidation, and to a lesser extent upon the pressure. It may be defined generally as the maximum oxygen concentration at which mixtures of the olefin, inert gas (steam, nitrogen, etc.), and oxygen form at the pressure employed non-explosive mixtures at all values of the ratio $\theta$, in which $$\theta = \frac{C_{olefin}}{C_{inert\ gas}}$$

in which $C_{olefin}$ and $C_{inert\ gas}$ represent the volume concentration of olefin and inert gas, respectively, in the mixture. In the case of propylene the oxygen concentration at the said critical level is about 10% by volume from atmospheric pressures to pressures as high as about 300 pounds per square inch (gauge). In the case of isobutylene, the corresponding value is about 11% oxygen. In accordance with the present invention, when the oxidation process is conducted with a gaseous feed to the reactor containing oxygen in an amount below the concentration required to produce an explosive mixture, the concentration of oxygen preferably is limited to concentrations below the aforesaid critical predetermined level. Reactivation of the catalyst may be accomplished directly and without necessity for further treatments by periodically and for brief intervals replacing the stream of olefin-containing feed to the reactor by a stream of a mixture of oxygen and inert gas in which the oxygen concentration is below the aforesaid critical predetermined level. In many cases it is necessary only to shut off the flow of the olefin to the catalyst, the continued flow of the balance of the feed, i. e., the oxygen or air and the inert gas, serving to reactivate the catalyst. Or the entire reactor feed may be diverted or discontinued, and it may be replaced by a suitable stream of oxygen-containing olefin-free gas, such as air or oxygen diluted with a suitable amount of an inert gas, containing the oxygen at a concentration below the aforesaid critical predetermined level. When thus carried out, the process of the invention provides for increased safety of operation as well as an efficient method for reactivation of the cuprous oxide catalyst, having the advantages hereinbefore and hereinafter indicated.

The method of the present invention may be employed in conjunction with other methods for reactivating the cuprous oxide catalyst, or it may be employed as the sole reactivation treatment applied.

In an experiment illustrative of the method of the invention, a gaseous mixture containing about 30% by volume of propylene, 37.5% by volume of air and about 32.5% by volume of steam, was passed over a catalyst consisting essentially of cuprous oxide, deposited on silicon carbide porous aggregates at 375° C. and 45 pounds per square inch (gauge) pressure. The product (acrolein) was collected by condensation from the reactor effluent, and samples of the effluent were withdrawn at intervals for analysis. During the course of a 28-hour run under these conditions, the following results were observed:

| Time (hours) | Percent Consumption of the Oxygen Fed |
|---|---|
| 4 | 79 |
| 12 | 75 |
| 21 | 51 |
| 28 | [1] 68 |

[1] The increase in this period was due to a slight shift upwards in operating temperature. At constant temperature, oxygen consumption equal to or lower than the preceding observation would have been observed.

At the end of the 28-hour period, the flow of propylene was discontinued and air was passed over the catalyst at 387° C. for 10 minutes. Thereafter, the entire reaction mixture was restored. The activity of the catalyst was increased by the treatment so that in the immediately following period of continued operation an oxygen conversion of 93% was obtained. After a further period of operation the catalyst, which again had lost activity, was again treated with air at about 385° C. High activity of the catalyst was restored. By intermittently interrupting the flow of olefin or of the olefin and the steam to the catalyst, and thus sweeping the catalyst with the oxygen-containing gas in the absence of the olefin, high overall catalyst activity was maintained for prolonged periods of time.

While reference has been made to certain details and embodiments of the invention, it will be apparent to those skilled in the art that various modifications and changes may be made therein without departing from the principles of the invention or from the scope of the hereto appended claims.

We claim as our invention:

1. In a continuous process for the oxidation of propylene to acrolein by passing a gaseous mixture comprising propylene, oxygen, and an inert gas into contact with a solid catalyst consisting essentially of cuprous oxide at a pressure between about atmospheric pressure and about 300 pounds per square inch (gauge) and at a temperature within the range of from about 300° C. to about 500° C., adjusting and maintaining the oxygen content of said gaseous mixture at a concentration not greater than about 10 per cent by volume, periodically and for brief intervals of time, and prior to material deposition of carbonaceous, tarry, or like materials on the catalyst, replacing the flow of said gaseous mixture to the catalyst by flow of a gaseous mixture of oxygen and inert gas containing oxygen in a concentration not greater than about 10 per cent by volume while maintaining the temperature within said range of from about 300° C. to about 500° C., and after each interval of flow to the catalyst of said gaseous mixture of oxygen and inert gas restoring the flow of the catalyst of said gaseous mixture containing propylene.

2. In a continuous process for the oxidation of an olefin containing at least three carbon atoms to an unsaturated carbonylic compound of the group consisting of the unsaturated aldehydes and the unsaturated ketones by passing a gaseous mixture comprising an olefin containing at least three carbon atoms and oxygen over a fixed bed of a solid catalyst consisting essentially of cuprous oxide at a temperature within the range of from about 300° C. to about 500° C., maintaining high overall catalyst activity by discontinuing at intervals for brief periods of time, and prior to material deposition of carbonaceous, tarry, or like materials on the catalyst, the flow of the olefin to the catalyst while maintaining the operating conditions otherwise substantially unchanged, and after each period of discontinued flow of olefin restoring the flow of the olefin to the catalyst.

3. The process of claim 2 in which the olefin is propylene and the unsaturated carbonylic compound is acrolein.

4. In a continuous process wherein a gaseous mixture comprising an olefin containing at least three carbon atoms, molecular oxygen, and an inert gas is passed into contact with a fixed feed of a solid catalyst consisting essentially of cuprous oxide at a temperature within the range of from about 150° C. to about 600° C. to oxidize catalytically the olefin to an unsaturated carbonylic compound of the group consisting of the unsaturated aldehydes and the unsaturated ketones, maintaining high overall activity of the catalyst, said catalyst being devoid of material deposits of carbonaceous, tarry, or like materials, by at intervals and successively shutting off olefin flow, restoring olefin flow, while maintaining the conditions otherwise substantially unchanged, and so doing at intervals throughout the duration of the process.

5. The process of claim 4 in which the olefin is propylene and the unsaturated carbonylic compound is acrolein.

6. In a continuous process for the oxidation of an olefin containing at least three carbons atoms to an unsaturated carbonylic compound of the group consisting of the unsaturated aldehydes and the unsaturated ketones by passing a gaseous mixture comprising an olefin containing at least three carbon atoms, oxygen, and an inert gas into contact with a solid catalyst consisting essentially of cuprous oxide at a temperature within the range of from about 150° C. to about 600° C., the method of restoring activity to a catalyst which has declined in activity through use in said process under operating conditions detrimental to the activity of the catalyst but which is devoid of material deposits of carbonaceous, tarry, or like materials, comprising sweeping the catalyst with a gaseous mixture consisting of up to about 35% by volume of oxygen and inert gas at a temperature within said range of from about 150° C. to about 600° C. until the activity of the catalyst is substantially restored.

7. In a continuous process for the oxidation of an olefin containing at least three carbon atoms to an unsaturated carbonylic compound of the group consisting of the unsaturated aldehydes and the unsaturated ketones by passing a gaseous mixture comprising an olefin containing at least three carbon atoms, air, and steam into contact with a solid catalyst consisting essentially of cuprous oxide at a temperature within the range of from about 150° C. to about 600° C., the method of restoring activity to a catalyst which has declined in activity through use in said process under operating conditions detrimental to the activity of the catalyst but prior to material deposition of carbonaceous, tarry, or like materials thereon, comprising sweeping the catalyst at a temperature within said range of from about 150° C. to about 600° C. with a gaseous mixture consisting of air and steam until the activity of the catalyst is substantially restored.

8. In a continuous process for the oxidation of an olefin containing at least three carbon atoms to an unsaturated carbonylic compound of the group consisting of the unsaturated aldehydes and the unsaturated ketones by passing a gaseous mixture comprising an olefin containing at least three carbon atoms and air into contact with a solid catalyst consisting essentially of cuprous oxide at a temperature within the range of from about 150° C. to about 600° C., the method of restoring activity to a catalyst which has declined in activity through use in said process under operating conditions detrimental to the activity of the catalyst said catalyst being devoid of material deposits of carbonaceous, tarry, or like materials thereon, comprising sweeping the catalyst with air until the activity of the catalyst is substantially restored.

9. In a continuous process for the production of an unsaturated carbonylic compound of the group consisting of the unsaturated aldehydes and the unsaturated ketones by oxidation of an olefin containing at least three carbon atoms in the presence of a solid catalyst consisting essentially of cuprous oxide, which process comprises passing into contact with said catalyst at a temperature within the range of from about 150° C. to about 600° C. a gaseous mixture of an olefin containing at least three carbon atoms, molecular oxygen, and an inert gas, the method of restoring activity to a catalyst which has declined in activity through use in said process under operating conditions detrimental to the activity of the catalyst but prior to material deposition of carbonaceous, tarry, or like materials thereon, comprising sweeping the catalyst at a temperature within said range of from about 150° C. to about 600° C. with a gaseous mixture of oxygen and inert gas until the activity of the catalyst is substantially restored.

10. The process of claim 9 in which the olefin is propylene and the unsaturated carbonylic compound is acrolein.

KENNETH D. DETLING.
THURSTON SKEI.

REFERENCES CITED

The following references are of record in the file of this patent:

UNITED STATES PATENTS

| Number | Name | Date |
|---|---|---|
| 2,118,829 | Storch | May 31, 1938 |
| 2,383,711 | Clark et al. | Aug. 28, 1945 |
| 2,451,485 | Hearne et al. | Oct. 19, 1948 |